United States Patent

[11] 3,612,017

| [72] | Inventors | Masayuki Ishizaki;<br>Koichi Kawatake; Ryoji Kasama; Masaki Kawai, all of Hitachi-shi, Japan |
|---|---|---|
| [21] | Appl. No. | 810,201 |
| [22] | Filed | Mar. 25, 1969 |
| [45] | Patented | Oct. 12, 1971 |
| [73] | Assignee | Hitachi, Ltd.<br>Tokyo, Japan |
| [32] | Priority | Apr. 10, 1968 |
| [33] | | Japan |
| [31] | | 43/23348 |

[54] SYSTEM FOR AUTOMATICALLY CONTROLLING VEHICLE SPEED
12 Claims, 5 Drawing Figs.

[52] U.S. Cl. ...................................................... 123/102, 180/105
[51] Int. Cl. ...................................................... F02d 11/10
[50] Field of Search ........................................... 123/102; 180/105; 307/304

[56] References Cited
UNITED STATES PATENTS

| 3,060,602 | 10/1962 | Buttenhoff | 180/105 E UX |
| 3,198,985 | 8/1965 | Haskell | 180/105 E UX |
| 3,344,880 | 10/1967 | Iwashita et al. | 123/102 |
| 3,455,411 | 7/1969 | Carp et al. | 180/105 |
| 3,485,316 | 12/1969 | Slavin et al. | 123/102 |

Primary Examiner—Mark M. Newman
Assistant Examiner—Cort R. Flint
Attorney—Craig, Antonelli & Hill ABSTRACT: A system for automatically controlling vehicle speed, which is operative in such a manner that a voltage generated by a generator adapted to generate a voltage in proportion to the speed of an automotive vehicle is constantly impressed on the gate electrode of a field-effect transistor and also on the gate electrode of another field-effect transistor and a memory condenser through a normally closed switch, said two field-effect transistors and the respective load resistances forming a bridge circuit, and when automatic control is desired, the potential difference across the potential-detecting terminals of said bridge circuit and its deformation polarity are detected, with said normally closed switch open, whereby an electric motor is controlled for adjusting the degree of opening of the throttle valve of a carburetor.

SYSTEM FOR AUTOMATICALLY CONTROLLING VEHICLE SPEED

The present invention relates to a system of automatically controlling the running speed of a vehicle to a desired value.

Speed control of an automotive vehicle is generally effected by the throttle valve of a carburetor. An automotive vehicle equipped with a fuel injection device does not have a carburetor but has a throttle valve in the intake manifold, by which the speed of the vehicle is controlled. Normally, the throttle valve is operated manually but where a vehicle is driven at a fixed speed for a prolonged period on a highway or the like, it is advantageous to control the throttle valve automatically in order to reduce the burden on the driver. In this regard, a number of automatic control means have been proposed heretofore but with any one of them the speed-setting operation and the operation for switching from manual control to automatic control are cumbersome.

In general, an automatic control system comprises means for detecting the running speed of an automotive vehicle, means for setting a reference value corresponding to a desired running speed, means for comparing the detected value with the reference value and means for controlling the degree of opening of the throttle valve according to the result of the comparison. Means for controlling the degree of opening of the throttle valve are classified into an electric motor type, a piston type and a diaphragm type. The piston type and the diaphragm type are defective in that prompt and accurate control of hydraulic pressure of pneumatic pressure is considerably difficult from the practical design point of view. The speed-detecting means, the reference-value-setting means and the comparing means are broadly classified into an electrical type and a mechanical type, of which the electrical type is advantageous from the standpoints of accuracy, maintenance, service life and handling. Hence, control systems of this type predominantly employ electrical means.

An electric control system is so designed that the running speed of an automotive vehicle is converted into an electric signal of a voltage corresponding to the speed by means of a generator and said electric signal voltage is compared with a reference voltage corresponding to a desired speed, which is obtained by a sliding-type or a tap-type potentiometer-type potential divider, to create a differential signal and an electric motor is controlled according to said differential signal to control the degree of opening of the throttle valve until said differential signal becomes zero. However, the operation of selecting a desired speed with the potentiometer-type potential divider is so troublesome for the driver that simplification of the operation is desired.

An object of the present invention, therefore, is to provide an automatic speed control system by which the running speed of a powered vehicle, particularly of an automotive vehicle, can be maintained at a desired value by a very simple manual operation.

Another object of the invention is to provide an automatic speed control system by which any running speed can be selected as a desired value by a single-step switching operation.

Still another object of the invention is to provide an automatic speed control system which is so designed that a desired running speed can be changed to a new value by a switching operation.

The present invention has many other objects and advantages which are related to the process of materializing a system capable of attaining the objects set forth above and which will become apparent as a detailed description on a practical system proceeds with reference to the accompanying drawings.

According to the present invention, there is provided a device for automatically controlling the running speed of a vehicle which is so constructed that the running speed of the vehicle is successively converted into an electric signal by speed-detecting means and given to memory means during operation of the vehicle under manual control, and when the vehicle is under automatic control, said speed-detecting means is disconnected from said memory means and the running speed of the vehicle is controlled by a difference between the value of the electric signal then memorized in the memory means and the value of the electric signal thereafter obtained from the speed-detecting means, and the polarity of said difference.

The present invention will be described in detail in conjunction with the accompanying drawings, in which.

Figure 1:
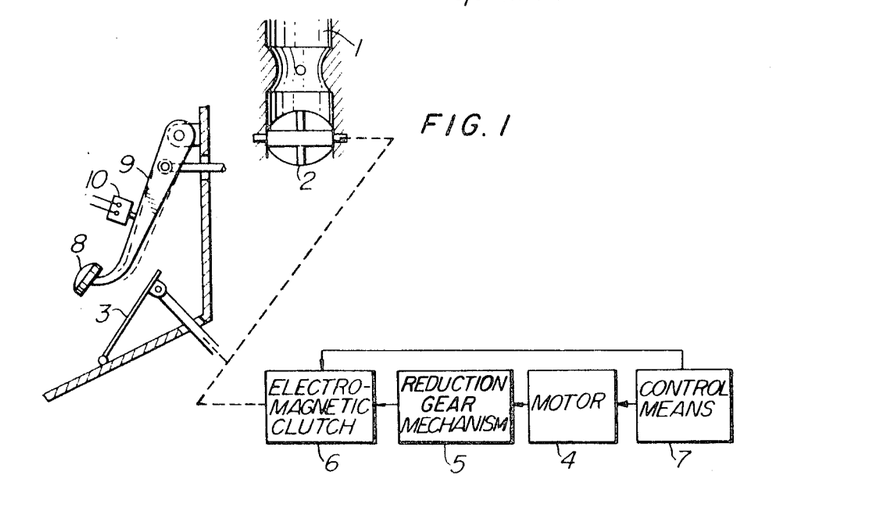
FIG. 1 is a block diagram of the automatic speed control system according to the present invention.

The present invention will briefly explained with reference to FIG. 1. A carburetor 1 is connected to the intake manifold of an internal combustion engine. A throttle valve 2 is operated from an accelerator pedal 3 during manual control operation and from an electric motor 4 during automatic control operation. The rotation of the electric motor 4 is transmitted to the throttle valve 2 through a reduction gearing 5. Therefore, when the vehicle is under manual control, the electric motor 4 and the reduction gearing 5 are disconnected from the throttle valve 2 by a magnetic clutch 6 commonly used in the art, because otherwise the throttle valve 2 would not automatically be returned by a return spring (not shown) since the electric motor 4 and the reduction gearing 5 constitute a large load for the return spring. The electric motor 4 and the magnetic clutch 6 are controlled by electric control means 7 which will be described in detail hereinafter. The electric control means generates a signal instructing normal rotation, reverse rotation or stoppage of the electric motor 4 in accordance with the running speed of the automotive vehicle, and a signal instructing release or engagement of the magnetic clutch 6 depending upon whether the vehicle is under manual control or automatic control. Even under automatic control, it is desirable for the throttle valve 2 to be returned to the minimum opening position upon actuation of a brake pedal 8 or a clutch pedal (not shown). For this purpose, a displacement of a pedal arm 9 is detected by a switch 10 and given to the electric control means 7 in the form of an electric signal.

Figure 5:
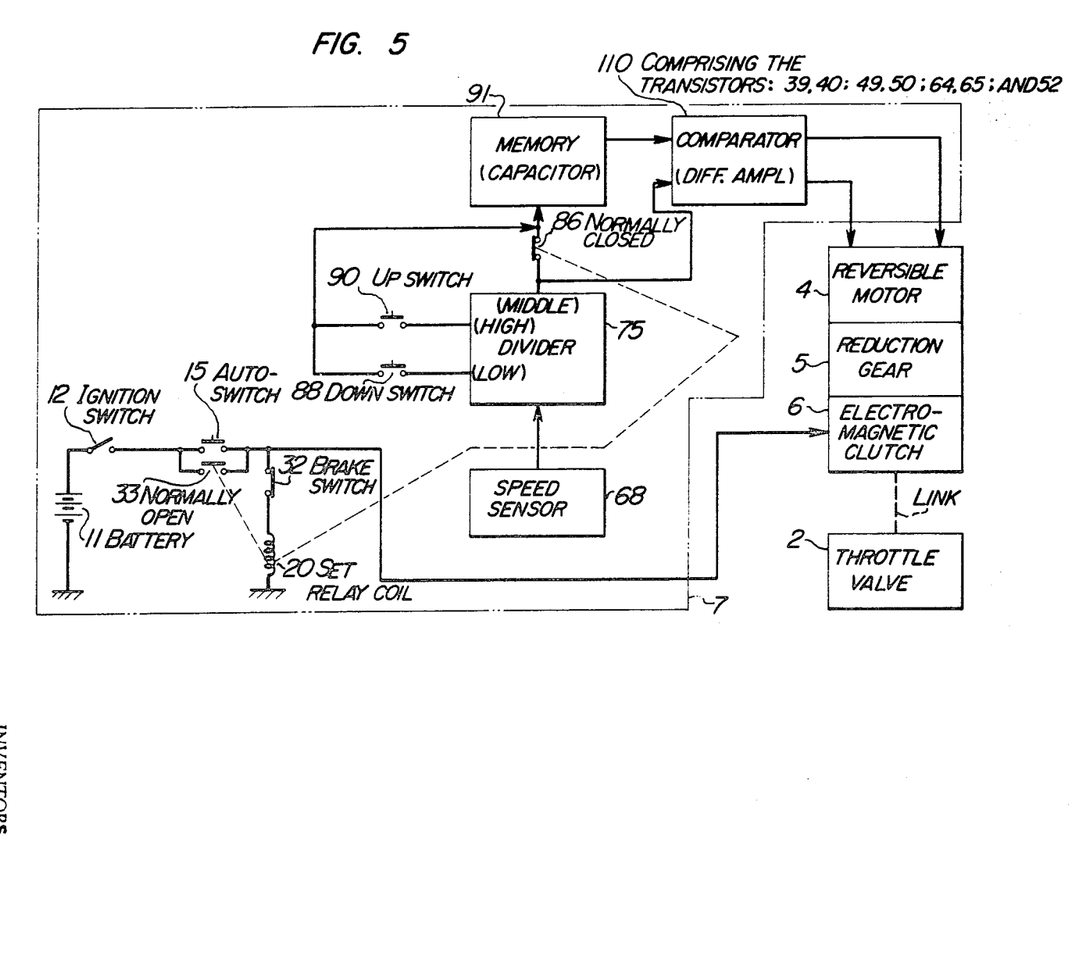
FIG. 5 shows a block diagram of the control means including associated elements of the automatic speed control system according to the present invention.

The outline of the construction and function of the electric control means in the system of this invention is illustrated in FIG. 5. A set relay coil 20 is connected through a normally closed brake switch 32, a normally open autoswitch 15 (pushbutton type) and an ignition or a key switch 12 to a battery 11. The autoswitch 15 is connected in parallel with a normally open self-holding contact 33 of the set relay 20. When the autoswitch 15 is temporarily closed with the ignition switch 12 beforehand closed the electromagnetic clutch 6 goes into and is maintained in an energized state, coupling the reduction gear 5 to the link mechanism of the throttle valve 2. The output voltage of a speed sensor 68 is applied to and divided by a voltage divider 75. The divider supplies its intermediate output to a first input terminal of a comparator 110. The intermediate output of the divider 75 is also supplied through a normally closed contact 86 to a memory 91 to be stored therein, and the stored value therein is supplied to a second input terminal of the comparator 110. When the vehicle is placed under automatic control, a reversible motor 4 is driven in accordance with the difference between the signals at both input terminals of the comparator 110 to thereby operate the throttle valve 2 through the reduction gear 5 and the electromagnetic clutch 6. When under automatic control the switch 86 is maintained open, so that the vehicle speed is controlled to accord with the memory output. When it is desired to increase the vehicle speed, an "Up" switch 90 may be closed to supply a modifying signal for a higher speed from the high-speed output terminal of the divider 75 to the memory 91. On the other hand, if it is desired to decrease the vehicle speed, a "Down" switch 88 may be closed to supply a modifying signal for a lower speed from the low-speed output terminal of the divider 75 to the memory 91. The brake switch 32 acts to release the automatic control upon depression of the brake pedal.

Figure 2:
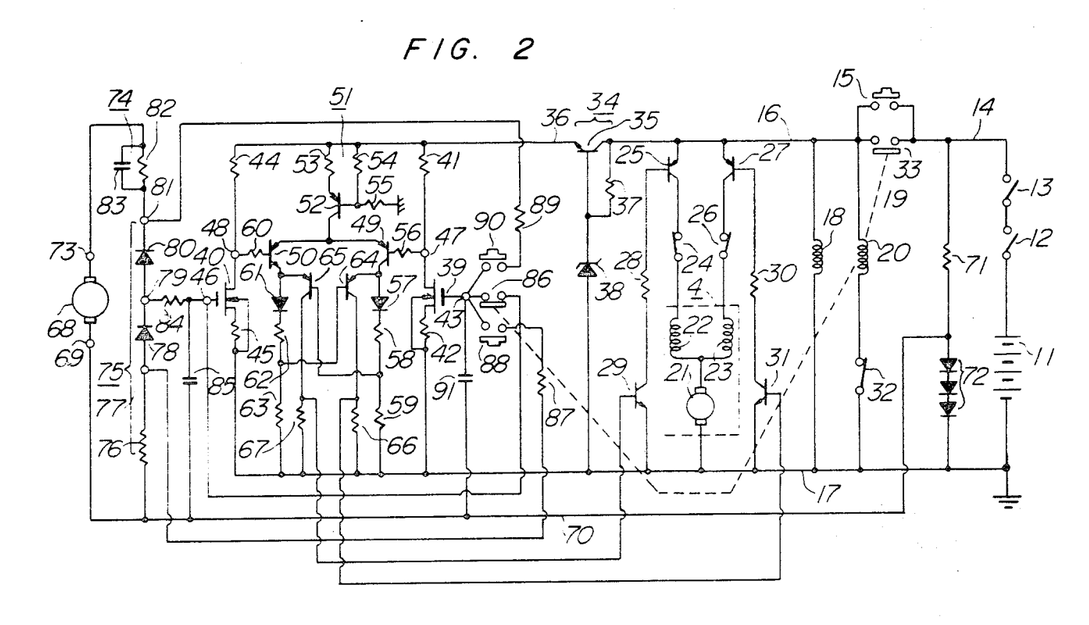
FIG. 2 is a circuit diagram showing one form of the electric connection of control means of the automatic speed control system of the present invention.

The electric control means 7 will next be described in detail with reference to FIG. 2. Numeral 11 designates a storage battery mounted on the automotive vehicle and constituting a DC power source for the electric control means. The negative electrode of the battery 11 is grounded to the vehicle body, while the positive electrode thereof is connected to a conductor 14 through a key switch 12 and a limit switch 13. The limit switch 13 is so arranged that it is closed when a transmission gear (not shown) is in a "top" position. Where the automotive vehicle is not provided with the transmission gear but is equipped with a torque converter, the limit switch is arranged so as to be closed when said converter is set in a "drive" position. A normally open pushbutton switch 15 is disposed between conductors 14 and 16. Between this conductor 16 and a conductor 17 which is to be grounded to the vehicle body, are connected the electric motor 4 for operating the throttle valve 2, a solenoid 18 of the magnetic clutch 6 and a solenoid 20 of a self-holding relay 19 to be described later. The electric motor 4 consists of a DC series motor. Field windings 22, 23 to be electrically connected in series to an armature 21 are provided for normal rotation and for reverse rotation respectively. A reversible rotation characteristic can be easily obtained by arranging such that the polarity of a magnetic field generated upon conducting a current through the field coils 22, 23 becomes opposite to that of the armature 21. An outer terminal of the armature 21 is connected to the conductor 17. An outer terminal of the field coil 22 is connected to the collector electrode of a PNP-type transistor 25 through a limit switch 24 associated with the throttle valve, while an outer terminal of the other field coil 23 is connected to the collector electrode of another PNP-type transistor 27 through another limit switch 26 associated with the throttle valve. Where the degree of opening of the throttle valve 2 is increased by the normal rotation of the electric motor 4, the limit switches 24 and 26 are arranged such that the former is opened at the maximum degree of opening of the throttle valve 2 and the latter is opened at the minimum degree of opening of the same. The emitter electrodes of the transistors 25, 27 are connected to the conductor 16. The base electrode of the transistor 25 is connected to the collector electrode of NPN-type transistor 29 through a resistor 28, while the base electrode of the other transistor 27 is connected to the collector electrode of an NPN-type transistor 31 through a resistor 30, and the emitter electrode of both transistors are connected to the conductor 17. Inserted between the solenoid 20 of the self-holding relay 19 and the conductor 17 is a contact 32 of the switch 10 which is to be opened upon actuation of the brake pedal 8 or the clutch pedal (not shown) and a normally open, self-holding contact 33 of said relay is electrically connected to the aforesaid pushbutton switch 15 in parallel. Still another switch of the relay 19 will be described later.

Numeral 34 designates a constant-voltage circuit. The collector electrode of an NPN-type transistor 35, used as control means, is connected to the conductor 16 and the emitter electrode thereof to a conductor 36, and a resistor 37 is connected between the collector electrode and the base electrode of the transistor 35. Further, the base electrode of the transistor 35 is connected to the conductor 17 through a Zener diode 38.

Numerals 39 and 40 designate a first and a second field-effect transistor respectively. The drain electrode of the first field-effect transistor 39 is connected to the conductor 36 through a resistor 41 and the source electrode thereof to the conductor 17 through a resistor 42. A first control electrode having an extremely high input impedance characteristic is connected to a first input terminal 43 and a second control electrode is connected to that side of the resistor 42 which is opposite to the source electrode side. The drain electrode of the second field-effect transistor 40 is connected to the conductor 36 through a resistor 44 and the source electrode thereof to the conductor 17 through a resistor 45. A first control electrode having an extremely high input impedance characteristic is connected to a second input terminal 46 and a second control electrode is connected to that side of the resistor 45 which is opposite to the source electrode side. The resistors 42, 45 are preferably of variable type in the light of the fact that they serve to uniformalize the transmission characteristic and the temperature characteristic of the field-effect transistors 39, 40. The field-effect transistors 39, 40 and the resistors 41, 44 form a bridge-detecting circuit between the conductors 17 and 36, and detection terminals 47, 48 are led from the drain electrodes of the field-effect transistors 39, 40 respectively. Numerals 49, 50 designate PNP-type transistors whose emitter electrodes are connected with each other and to the conductor 36 through a constant-current circuit 51. The constant-current circuit 51 comprises a PNP-type transistor 52 which has the collector electrode connected to the emitter electrode of the PNP-type transistors 49, 50, the emitter electrode connected to the conductor 36 through a resistor 53 and the base electrode connected to the conductor 36 through a resistor 54 and to the ground through a resistor 55. The base electrode of the transistor 49 is connected through a resistor 56 to the detection terminal 47 which is connected to the drain electrode of the first effect transistor 39 and the collector electrode thereof is connected to the conductor 17 through a diode 57 and resistors 58, 59, which are connected in series in the order mentioned. The base electrode of the other transistor 50 is connected through a resistor 60 to the detection terminal 48 which is connected to the drain electrode of the second field-effect transistor 40, and the collector electrode thereof is connected to the conductor 17 through a diode 61 and resistors 62, 63, which are connected in series in the order mentioned. Numerals 64 and 65 designate PNP-type transistors. The emitter electrode of the transistor 64 is connected to the collector electrode of the transistor 49 and the base electrode thereof is connected to the intermediary between the resistors 62 and 63. The collector electrode of the transistor 64 is connected to the base electrode of the transistor 31 and to the conductor 17 through a resistor 66. The emitter electrode of the other transistor 65 is connected to the collector electrode of the transistor 50 and the base electrode thereof is connected to the intermediary between the resistors 58 and 59. The collector electrode of the transistor 65 is connected to the base electrode of the transistor 29 and to the conductor 17 through a resistor 67. These transistors constitute comparing means.

Numeral 68 designates a DC generator adapted to generated a voltage corresponding to the running speed of the automotive vehicle upon detecting said running speed. The DC generator 68 is driven, for example, from the transmission gearing and has its positive output terminal 69 connected to conductor 70 which is connected in such a way that the potential thereof becomes slightly higher than that of the conductor 17 which is a reference potential used in the comparing means. Practically, this can be attained by connecting the conductor 70 to the intermediary between a resistor 71 and a plurality of diodes 72, which are connected across the conductor 14 and the conductor 17 in the order mentioned. By doing so, the potential of the conductor 70 can be raised with respect to the potential of the conductor 17 by an amount equal to the barrier voltage of the diodes 72. The negative terminal 73 of the DC generator 68 is connected to the conductor 70 through an incomplete differentiation circuit 74 and a potential dividing circuit 75, which are connected in series. The potential dividing circuit 75 comprises a resistor 76, a first output terminal 77, a diode 78, a second output terminal 79, a diode 80 and a third output terminal 81, which are connected in series with each other and to the conductor 70. The incomplete differentiation circuit 74 comprises a resistor 82 and a condenser 83, which are connected with each other in parallel and connected across the third output terminal 81 and the negative output terminal 73.

The second output terminal 79 is connected to the conductor 70 through a resistor 84 and a condenser 85, and a DC voltage corresponding to the running speed of automotive vehicle appears across the terminals of the condenser 85. A terminal of the condenser 85 remote from the conductor 70 is connected to the first input terminal 43 and the second input terminal 46 of the comparing means respectively, with a normally closed relay contact 86 inserted between said terminal and the first input terminal 43. This relay contact 86 is opened when the solenoid 20 of the aforesaid self-holding relay 19 is energized. The first output terminal 77 and the third output terminal 81 are connected to the first input terminal 43 through a resistor 87 and a pushbutton switch 88 and through a resistor 89 and a normally open pushbutton switch 90 respectively. The pushbutton switches 88, 90 are provided in the driver's cabin, together with the aforesaid pushbutton switch 15. The pushbutton switch 88 is for deceleration and the pushbutton switch 90 is for acceleration. Memory means consists of a condenser 91 which is connected between the first input terminal 43 and the conductor 70. In order to maintain a signal memorized over an extended period, the condenser 91 used must be of such type which permits a minimum current leakage.

Now, the operation of the automatic speed control system of the construction described above, will be explained.

First of all, when the automotive vehicle is operated under manual control, the opening degree of the throttle valve 2 is controlled by the accelerator pedal 3. In this case, even though the key switch 12 and the limit switch 13 are closed, the self-holding contact 33 will not be closed unless the pushbutton switch 15 is closed. Therefore, no current flows through the conductor 16 and the solenoid 18 remains deenergized, allowing the throttle valve 2 to be operated smoothly without being subjected to the influence of the electric motor 4 and the reduction gearing 5. However, since the DC generator 68 is being driven, a voltage generated by said DC generator and corresponding to the running speed of the automotive vehicle is impressed on the first input terminal 43 and the second input terminal 46 in the comparing means from the second output terminal 79 in the potential dividing circuit 75 through the resistor 84. The voltage impressed on the first input terminal 43 charges the condenser 91.

When the driver desires to maintain the running speed automatically, it is only necessary to temporarily close the pushbutton switch 15 provided in the driver's cabin. Upon closing the pushbutton switch 15, the solenoid 20 of the self-holding relay 19 is energized, closing the self-holding contact 33. The pushbutton switch 15 is required to be held closed only for a period until the self-holding contact 33 is brought into a closed, position. Once the pushbutton switch 15 has been closed, the conductor 16 is connected to the battery 11, so that the solenoid 18 of the magnetic clutch 6 is energized and the electric motor 4 is operatively connected with the throttle valve 2. At the same time, the solenoid 20 of the relay 19 is energized, opening the contact 86. It is at this time that the voltage stored in the condenser 91 is memorized in the form of an electric signal corresponding to the running speed desired by the driver. After the throttle valve 2 has been connected to the electric motor 4, it will not be returned to the original position by the return spring, even if the accelerator pedal 3 is released, and is retained in its position by virtue of the frictional resistances of the reduction gearing 5 and the electric motor 4.

If the running speed of the automotive vehicle is not changed under such conditions, the control system operates in the following manner:

The magnitude of the voltage impressed on the first control electrode of the first field-effect transistor 39 and that of the voltage impressed on the first control electrode of the second field-effect transistor 40 in the comparing means are equal. Therefore, assuming that the field-effect transistors 39, 40 have the same transmission characteristic, the voltages at the drain electrodes of the respective transistors are the same and no potential difference can be obtained across the detection terminals 47, 48. When the potentials at the detection terminals 47, 48 are the same, the potentials at the base electrodes also become the same, as the emitter electrodes of the transistors 49, 50 are connected to the common constant-current circuit 51, and, therefore, the conductivities between the respective emitter electrodes and collector electrodes are the same, with the result that currents of the same magnitude flow from the collector electrodes of the respective transistors. A voltage drop of this current across the outer terminals of the diode 57 and the resistors 58 is impressed across the emitter electrode and the base electrode of the transistor 65, whereas a voltage drop across the outer terminals of the diode 61 and the resistor 58 is impressed on the emitter electrode and the base electrode of the transistor 64. In this case, it the values of the limited current of the constant-current circuit 51 and the resistors 58, 59 are set such that the magnitude of the aforesaid voltage drop, which occurs under such conditions that the conductivities between the emitter electrode and the collector electrode of the respective transistors 49, 50 are the same and the current from the constant-current circuit 51 is diverged equally to both transistors 49, 50, as described above, will be smaller than a value which energizes the transistors 64, 65, no current flows through the collector electrodes of the transistors 64, 65 under the aforesaid condition, i.e. the condition in which the running speed of the automotive vehicle is not changed. Therefore, the transistors 25, 27 are held in a deenergized state respectively and accordingly the electric motor 4 is held inoperative. If the condition in which the transistors 64, 65 are held deenergized and the electric motor 4 is held inoperative, is referred to as an irresponsive zone, the width of the irresponsive zone can be adjusted by varying the values of the resistors 58, 62. In other words, the dead zone is a zone in which the transistors 64, 65 remain deenergized, even with the collector currents of the transistors 49, 50 varying, increasing the width of the zone means so that the degree of opening of the throttle valve 2 will not be corrected even when the running speed of the automotive vehicle fluctuates to some extent. This means that the range of allowable deviation of the running speed is expanded, the reason for this will become apparent from the description to be given later.

Now, when the automotive vehicle proceeds onto an ascending slope and the running speed thereof is decreased, the control system operates as follows:

The voltage generated by the DC generator 68 decreases proportionally as the running speed of the automotive vehicle falls. The potential at the second output terminal 79 in the potential dividing circuit is negative with respect to the conductor 70 but, as the running speed decreases, the negative potential also decreases and the negative potential impressed on the second input terminal 46 in the comparing means decreases accordingly. As a result, the negative potential being impressed on the first control electrode of the second field-effect transistor 40 is decreased, resulting in a decrease of the internal impedance between the drain electrode and the source electrode and an increase of the conductivity. Thus, a larger current flows into the drain electrode. The potential at the detection terminal 48 is decreased, so that the voltage impressed on the emitter electrode and the base electrode of the transistor 50 is increased, with the internal impedance between the emitter electrode and collector electrode of the transistor 50 decreasing. On the other hand, the voltage impressed on the first control electrode of the field-effect transistor 39 is one which is to be memorized in the condenser 91 and, since the internal impedance between the drain electrode and the source electrode does not change, the potential at the detection terminal 47 remains unchanged. Therefore, the current flowing through the emitter electrode of the transistor 50 increases. However, since the emitter electrode of the transistor 50 is connected to the constant-current circuit 51, the increased part of the voltage causes the current flowing through the emitter electrode of the transistor 49 on the other side to decrease. Consequently, the potential of the collector electrode of the transistor 50 and the potential across the resistors 62, 63 are increased as the collector current of said transistor increases, whereas the potential of the collector electrode of the other transistor 49 and the potential across the resistors 58, 59 is decreased. As a result, the voltage impressed across the emitter electrode and base electrode of the transistor 65 becomes large in the forward direction conducting the emitter electrode with the collector electrode, but the potential across the emitter electrode and base electrode of the other transistor 64 becomes large in the opposite direction, whereby the nonconductive state between the emitter electrode and the collector electrode is maintained. Upon energization of the transistor 65, the collector current thereof flows through the base electrode of the transistor 29 conducting the emitter electrode with the collector electrode, whereby the transistor 25 is energized allowing the current to flow through the field coil 22 and armature 21 of the electric motor 4. In this case, the electric motor 4 is driven in the normal direction and the rotation of the motor is transmitted to the throttle valve 2 through the reduction gearing 5 and the magnetic clutch 6, causing said throttle valve to rotate in an opening direction. Thus, the engine output is increased to make up for the speed reduction. When the running speed of the automotive vehicle has been recovered to the original level, the potentials at the detection terminals 47, 48 of the comparing means become equal, so that the electric motor 4 stops rotating and the throttle valve 2 is retained in its degree of opening.

When the automotive vehicle proceeds onto a descending slope and the running speed thereof is increased, the control system operates in the following manner:

Namely, in this case the voltage generated by the DC generator 68 increases in proportion to the increasing running speed of the vehicle, and accordingly the negative potential of the first control electrode of the second field-effect transistor 40 becomes large. As a result, the current supplied to the drain electrode of the transistor 40 is reduced and the potential at the detection terminal 48 rises. Thereafter, the control system operates exactly opposite the way described above for a corrective action against decreasing speed, whereby the electric motor 4 is driven in a reverse direction and the opening of the throttle valve 2 is decreased.

In either case, the current supply to the electric motor 4 is interrupted by means of the limit switch 24 or 26 when the opening of the throttle valve 2 has reached a maximum or minimum degree, because rotation of the throttle valve 2 beyond a predetermined range will result in breakage of mechanical parts.

When it is desired to change a desired running speed to a new value, with the automotive vehicle being operated under automatic control, the control system is operated as will be described hereunder: First of all, the operation of the control system for changing the proceeding speed from the initial desired value to a higher value will be explained.

Acceleration is effected during a period when the pushbutton switch 90 in the cabinet is closed by the driver. Namely, when the pushbutton switch 90 is closed, a negative voltage higher than that at the second output terminal 79 of the potential dividing circuit is impressed on the first input terminal 43 of the comparing means and the memory condenser 91 from the third output terminal 81 through the resistor 89 and the pushbutton switch 90. Therefore, the potential difference across the second output terminal 79 and the third output terminal 81 creates a differential between the conductivities of the field-effect transistors 39 and 40, with the accompanying result that a potential difference occurs across the detection terminals 47 and 48. Such differential is produced by the fact that as a result of the increasing of the negative potential which is supplied to the first control electrode of the first field-effect transistor 39, the current fed to the drain electrode is decreased and the potential of the detection terminal 47 rises. Therefore, the conductivity of the transistor 49 is decreased, while the conductivity of the transistor 50 is increased relatively. Since this is the same phenomenon as that mentioned previously which occurs when the running speed is reduced, the electric motor 4 is driven in the normal direction and thereby the opening of the throttle valve 2 is increased, accelerating the automotive vehicle. With the pushbutton switch 90 being closed, the negative voltage impressed on the first input terminal 43 is always greater than the voltage impressed on the second input terminal 46 independently of the vehicle speed. Therefore, the automotive vehicle is accelerated through the period when the pushbutton switch 90 is closed. The pushbutton switch 90 is released to open when the vehicle speed has reached a new desired level, and a voltage corresponding to the running speed at that time is memorized in the condenser 91. Thereafter, the new running speed is maintained in the manner described previously.

Even if the pushbutton switch 90 is opened at a desired speed, it sometime happens that vehicle does not run at the desired running speed. The reason is that since the actual running speed of the vehicle changes according to the difference between accelerating torque of engine and accelerating resistance (inertia of the vehicle) and the voltage appearing across the condenser 91 changes according to the time constant determined by the resistance 89 and the condenser 91, the voltage appearing across the condenser 91 at the instant the vehicle reaches a new desired running speed happens not to be equal to the value corresponding to the new desired running speed. In this case, when the pushbutton switch 90 is opened, the vehicle running speed will be that corresponding to the voltage appearing across condenser 91. On the other hand even if the voltage across condenser 91 is equal to that corresponding to the desired running speed, since the throttle valve is stopped at the instant opening degree, the vehicle is accelerated further until the automatic control of the system begins to operate. This period during which the automatic control can not operate is called a dead zone.

Now, the operation of the control system for changing the running speed from the initial set value to a lower value will be explained. In this case, deceleration is effected by closing the pushbutton switch 88. Namely, when the pushbutton switch 88 is closed, the first input terminal 43 is impressed with a smaller negative potential from the first output terminal 77 of the potential dividing circuit 75. Therefore, the conductivity between the drain electrode and source electrode of the first field-effect transistor 39 is increased and the running speed of the vehicle is reduced by the control system operating reversely of the way described above for accelerating the vehicle.

Since such a change in running speed to a new desired value resorts to a bias voltage depending upon the magnitudes of barrier voltages of the diodes 78, 80 inserted in the potential dividing circuit 75, the acceleration or deceleration can be effected at a constant rate, irrespective of the magnitude of the voltage generated by the DC generator 68.

It is also to be noted that, since the voltage generated by the DC generator is supplied to the potential dividing circuit 75 through the incomplete differentiation circuit 74, a potential change incident to a change in running speed immediately appears at the output terminals 77, 79 and 81 and, therefore, a highly responsive control is possible. Stable control of the speed without any hunting can be accomplished by adjustment of the time constant of the incomplete differential circuit 74 and the width of the dead zone of the comparator circuit and the rotational speed of the throttle valve driven by the motor, in accordance with the responsive characteristic of the vehicle,.

As stated previously, it is desirable that the transmission characteristics of the first field-effect transistor 39 and the second fieldaeffect transistor 40, used as comparing means, are equal to each other but it is practically difficult to find field-effect transistors of the same transmission characteristic. In order to make the transmission characteristics of both field-effect transistors as uniform as possible, according to the present invention a resistor is connected in series to the source electrode of each field-effect transistor and that side of the resistor which is remote from the source electrode is connected to the second control electrode, so as to adjust the transmission characteristic of one field-effect transistor relative to that of another field-effect transistor. Such means for correcting the transmission characteristic is also highly effective for the correction of temperature characteristic.

Figure 3:
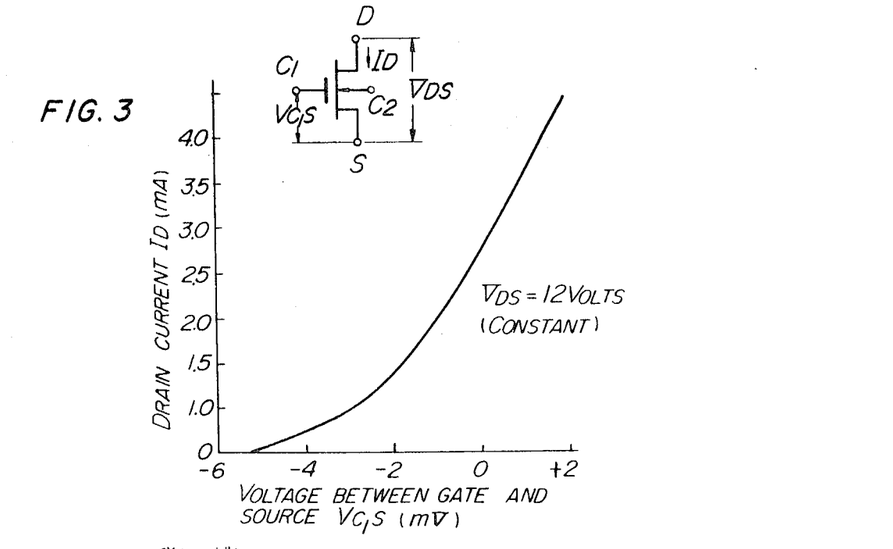
FIG. 3 is a diagram graphically showing the transmission characteristic of a field-effect transistor.

Further, the transmission characteristic of the field-effect transistor is preferably used in a region wherein the potential of the first control electrode is negative with respect to the potential of the source electrode, because of linearity, as will be seen from FIG. 3. According to the present invention, therefore, the electric signal voltage corresponding to the running speed of a vehicle is used in negative polarity. However, since the transmission characteristic may also be used in a limited scope of a region wherein the potential of the first control electrode is positive relative to the potential of the source electrode, the potential of the conductor is made higher than that of the conductor 17 to expand the range of controllable speed.

When the brake pedal 8 is depressed, the contact of the switch 10 is opened by a displacement of the lever 9. The solenoid 20 is deenergized and the contact 33 is opened, interrupting the current supply to the conductor 16. Thus, the automatic control is released. At the same time, the magnetic clutch 6 is released, so that the throttle valve 2 is placed under manual control using the accelerator pedal 3.

Next, the mechanical connection between the throttle valve, and the accelerator pedal and the electric motor, will be explained with reference to FIG. 4.

A rotary shaft 91 of the throttle valve 2 has an arm 92 rigidly connected to an end thereof. The arm 92 is operatively connected to an arm 94 by means of a connecting rod 95, which arm 94 is fixedly mounted on an operating rotary shaft 93. The operating rotary shaft 93 has an arm 96 rigidly connected to one end thereof. The arm 96 is operatively connected to an arm 98 by means of a connecting rod 99, which arm 98 is securely fixed to an output shaft 97 of the magnetic clutch 6. The output shaft 97 of the magnetic clutch 6 has a cam plate 100 fixedly mounted thereon, by which the limit switches 24 and 26 are opened at the minimum and the maximum opening angles of the throttle valve 2 respectively. An input shaft 101 of the magnetic clutch 6 is connected to the electric motor 7 through a reduction gearing 4.

On the other hand, an arm 103 having one end of a return spring 102 anchored thereto is fixedly mounted on the other end portion of the operating rotary shaft 93, and another arm 105 is pivotally mounted on said operating rotary shaft in adjacent relation to said arm 103, said arm 105 having a projection 104 for abutting engagement with said arm 103. Further, the arm 105 is operatively connected to the accelerator pedal 3 through a connecting rod 106, a lever 107 and another connecting rod 108.

Figure 4:
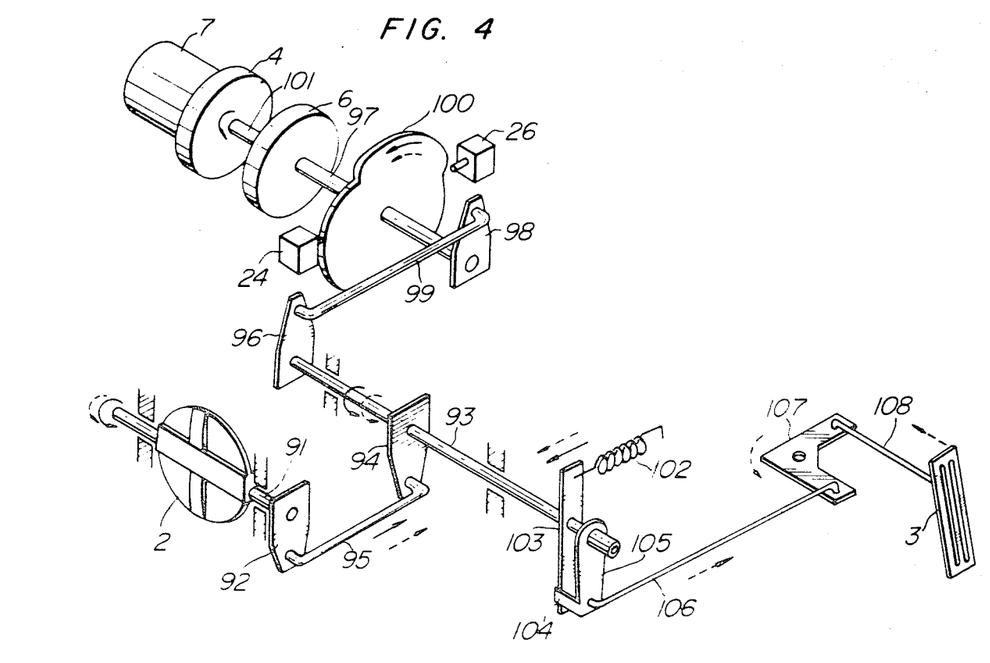
FIG. 4 is a perspective view diagrammatically showing the mechanical connection among a throttle valve, an accelerator pedal and an electric motor.

The illustration of FIG. 4 shows the mechanism, constructed as described above, in a position when the opening degree of the throttle valve 2 is substantially minimum. For increasing the opening of the throttle valve 2 by the electric motor 7, with the accelerator pedal 3 being released, the electric motor 7 is driven in the direction of the dotted line arrow. In this case, the accelerator pedal 3 is held stationary since the arm 103 fixedly mounted on one end of the operating rotary shaft 93 is rotated in a direction to move away from the projection 104 of the arm 105.

When the opening of the throttle valve 2 is desired to be increased by actuating the accelerator pedal 3, the reduction gearing 4 and the electric motor 7 are inoperative since the magnetic clutch 6 is in a released position. Upon pushing the accelerator pedal 3 in the direction of the dotted line arrow, the lever 107 is pivoted, whereby the arm 105 is caused to rotate through the connecting rod 106. Therefore, the arm 103, which is held in contact with the projection 104 under the bias of the return spring 102, is also caused to rotate by the arm 105. Thus, the operating rotary shaft 93 is rotated in a direction to increase the opening of the throttle valve 2. When the pressure is released from the accelerator pedal 3, the arm 103 is returned to the original position by the action of the return spring 102.

What is claimed is:

1. A system for automatically controlling the running speed of a power-driven vehicle, comprising a power source for driving said vehicle, means for controlling an output of said power source, speed-sensing means for generating an electric signal of a value corresponding to the running speed of the vehicle, comparing means having a first input terminal and a second input terminal for receiving electrical signals from the speed-sensing means and adapted to generate an output corresponding to the magnitude and the sign of the difference between the input electrical signals to both input terminals, a capacitor connected to one of the input terminals of said comparing means for storing the value of said electrical signal, switch means operated by a driver for disconnecting said one of said input terminals having said capacitor connected thereto from said speed-sensing means, operating means for operating said means for controlling the input of the power source for driving the vehicle so as to make the output of said comparing means zero and coupling means for coupling said means for controlling the output of the power source for driving the vehicle with said operating means when the speed-sensing means is disconnected from said one of said input terminals of said comparing means by the driver.

2. A system for automatically controlling the running speed of a power-driven vehicle as defined in claim 1, in which said comparing means includes a first field-effect transistor having the gate electrode thereof connected to said capacitor and a second field-effect transistor having the gate electrode thereof connected to said speed-detecting means, and said operating means is operated on the basis of an output differential between said transistors.

3. A system for automatically controlling the running speed of a power-driven vehicle as defined in claim 2, in which said first and second field-effect transistors in the comparing means each has a resistor connected to the source electrode thereof and a second gate electrode of each field-effect transistor is connected to that terminal of said resistor which is remote from the source electrode.

4. A system for automatically controlling the running speed of a power-driven vehicle as defined in claim 2, in which said first and second field-effect transistors form a bridge-detecting circuit together with resistors connected to the drain electrodes of said respective transistors and said operating means is operated on the basis of an electrical differential between the detection terminals of said bridge-detecting circuit.

5. A system for automatically controlling the running speed of a power-driven vehicle as defined in claim 4, including a differential amplifying circuit for converting the potential difference across the detection terminals of said bridge-detecting circuit in the comparing means into two signals corresponding to the differential polarity thereacross.

6. A system for automatically controlling the running speed of a power-driven vehicle as defined in claim 5, in which said differential amplifying circuit in the comparing means includes a pair of transistors respectively having the base electrodes thereof connected to the detection terminals of the bridge-detecting circuit and the emitter electrodes thereof being supplied with a current through a common constant-current circuit.

7. A system for automatically controlling the running speed of a power-driven vehicle as defined in claim 6, in which said pair of transistors are provided with two resistors respectively connected to the collector electrodes of said respective transistors in series and there are provided another pair of transistors having the emitter-base electrodes thereof connected to the intermediary between the collector electrode of one of said first pair of transistors and one of said resistors and to the intermediary between the collector electrode of the other one of said first pair of transistors and the other one of said resistors respectively.

8. A system for automatically controlling the running speed of a power-driven vehicle as defined in claim 2, in which a reference potential of the speed-detecting means corresponding to a reference potential of the field-effect transistors in the comparing means is positive in polarity.

9. A system for automatically controlling the running speed of a power-driven vehicle as defined in claim 8, in which said comparing means and said speed-detecting means are electrically connected with each other in such a manner that the reference potential of the latter becomes slightly higher than the reference potential of the former.

10. A system for automatically controlling the running speed of a power-driven vehicle as defined in claim 1, in which said speed-detecting means includes a generator connected to a rotary shaft rotating at a rate corresponding to the rotating speed of the vehicle and a voltage generated by said generator is led to an output terminal through an incomplete differentiation circuit consisting of a parallel circuit of a condenser and a resistor.

11. A system for automatically controlling the running speed of a power-driven vehicle as defined in claim 7, in which between the output terminals is connected a potential dividing circuit including two diodes and a resistor, which are connected with each other in series, the connecting point between said two diodes being connected to the gate electrode of the first field-effect transistor and also to the memory means through a switch which is opened in the state of automatic control, and the outer electrodes of said diodes being connected to the memory means through a normally open switch respectively.

12. A system for automatically controlling the running speed of a power-driven vehicle as defined in claim 5, in which the power source is an internal combustion engine and the control means for controlling the output of the internal combustion engine includes a throttle valve disposed in an intake manifold including a carburetor and an electric motor for operating said throttle valve, the rotation of said electric motor being reversibly controlled by the two signals obtained from the differential amplifying circuit in the comparing means.